Aug. 5, 1941. H. W. SIMPSON ET AL 2,251,377

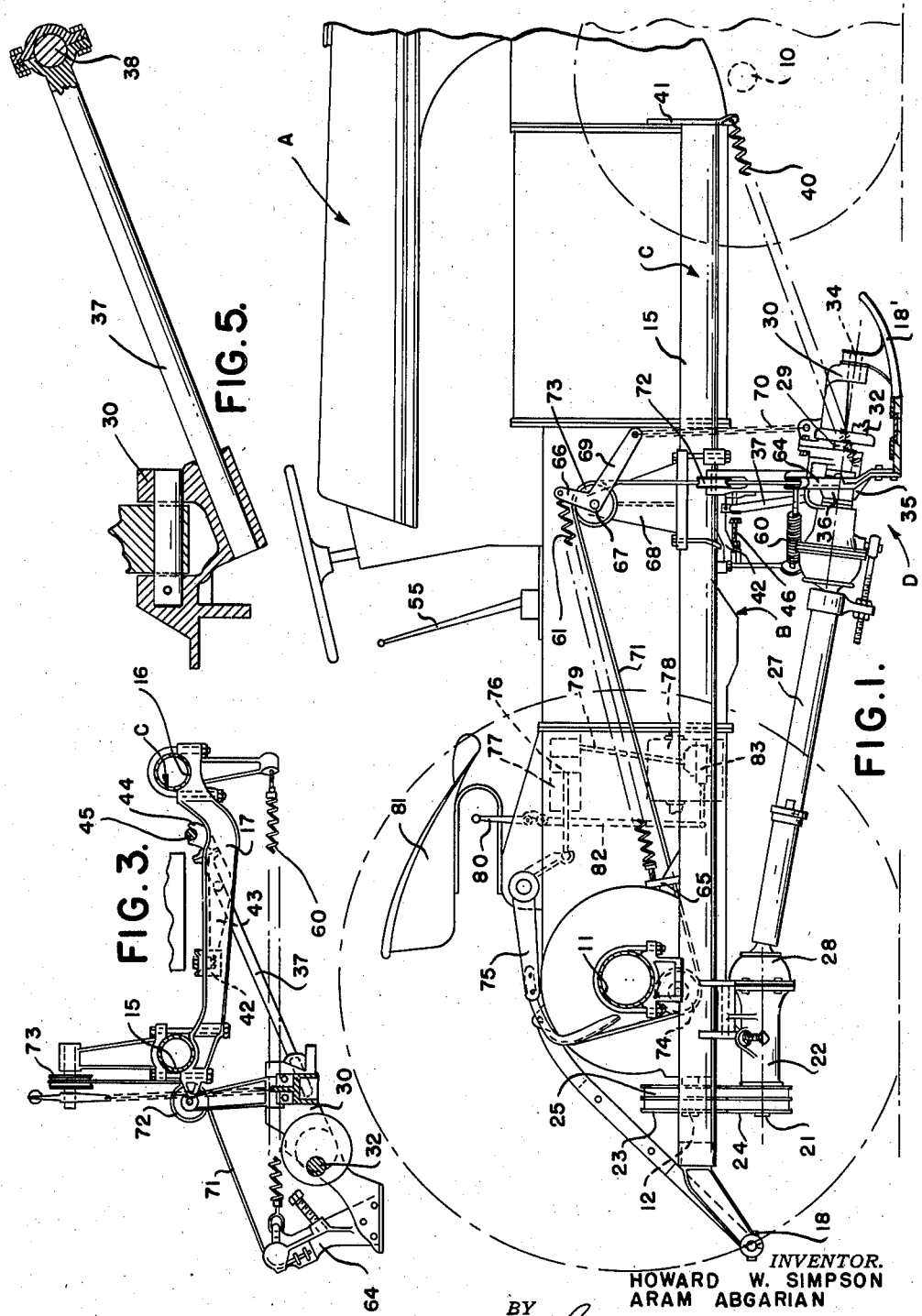

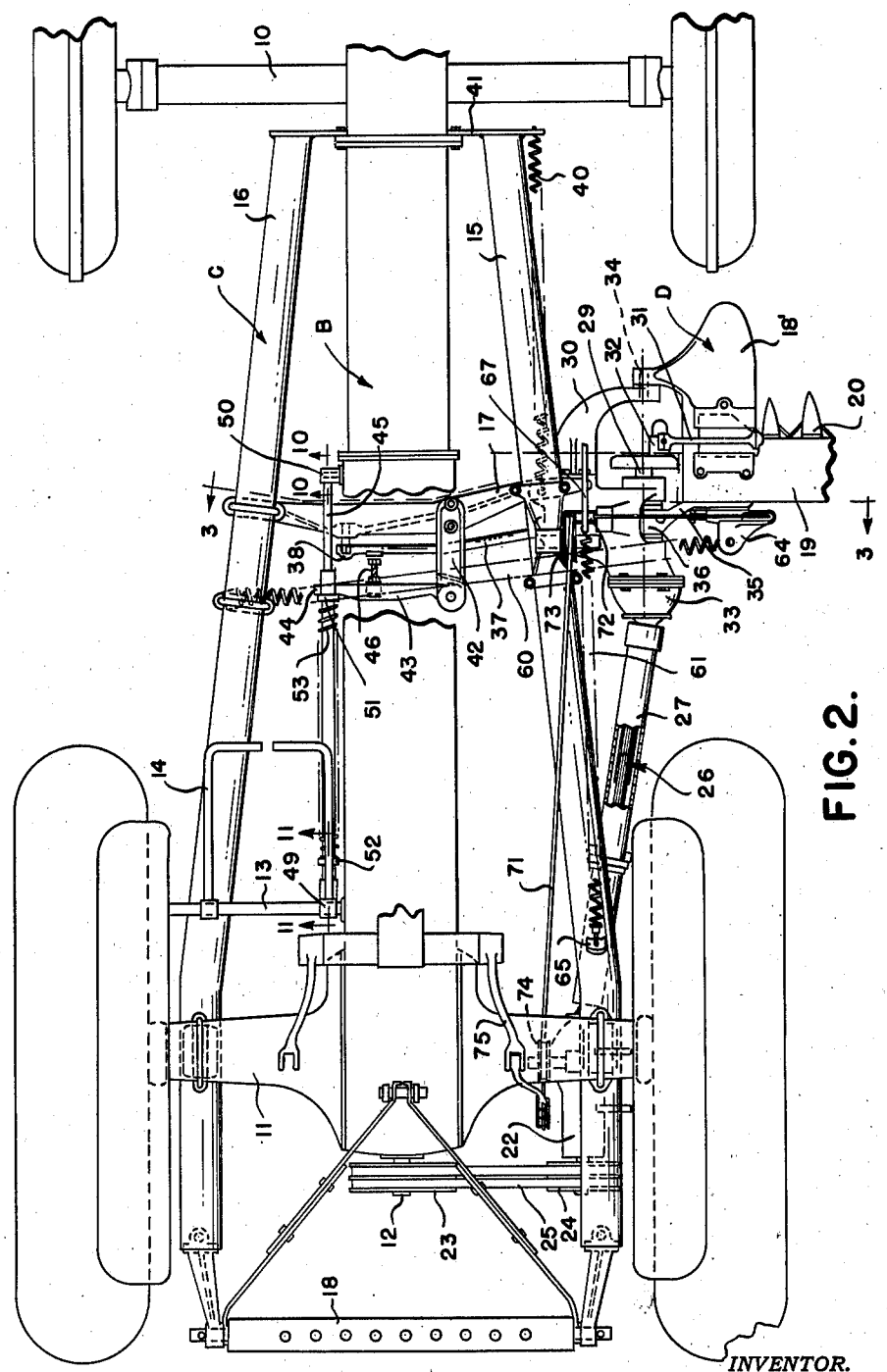

MOWING MACHINE

Filed June 10, 1940 3 Sheets—Sheet 3

INVENTOR.
HOWARD W. SIMPSON
ARAM ABGARIAN
BY *Whittemore, Hulbert & Belknap*
ATTORNEYS Patented Aug. 5, 1941

2,251,377

UNITED STATES PATENT OFFICE 2,251,377

MOWING MACHINE

Howard W. Simpson, Dearborn, and Aram Abgarian, Detroit, Mich., assignors to Detroit Harvester Company, Detroit, Mich., a corporation of Michigan Application June 10, 1940, Serial No. 339,801

10 Claims. (Cl. 56—25)

This invention relates generally to mowing machines such as tractor operated mowers and constitutes an improvement upon the structure embodied in the application filed January 22, 1940, bearing Serial No. 315,112.

One of the essential objects of the present invention is to provide an improved means for automatically disengaging or rendering inoperative the usual clutch of the tractor when the sickle bar of the mower assembly encounters an obstacle.

Another object is to provide a clutch operating means of this type that is operable by a part of the supporting means for the mower assembly.

Another object is to provide a clutch operating means adapted to be connected to the usual clutch pedal or manually operable member of the tractor so that the clutch may be operated by either the manually operable member or the automatically operated means mentioned.

Another object is to provide a clutch operating means that is actuable by a part of the mounting for the mower assembly during backswing of the assembly when it encounters an obstruction but that is otherwise free of said mounting and idle during vertical swinging movement of the mower assembly relative to the tractor.

Other objects, advantages and novel details of construction of this invention will be made more apparent as this description proceeds, especially when considered in connection with the accompanying drawings, wherein:

Figure 1 is a fragmentary vertical longitudinal sectional view through a mowing machine embodying our invention;

Figure 2 is a top plan view thereof;

Figure 3 is a cross sectional view taken substantially on the line 3—3 of Figure 2;

Figure 5 is a sectional view taken substantially on the line 5—5 of Figure 4;

Figure 4:
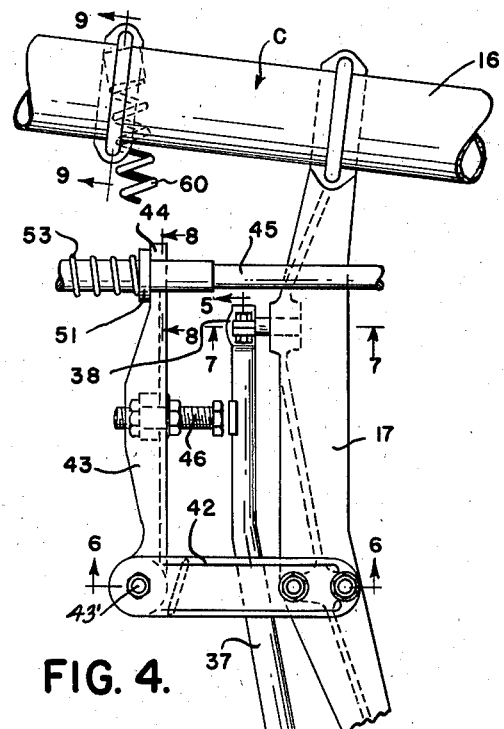
Figure 4 is an enlarged fragmentary plan view of the mower assembly mounting and associated clutch actuating means.
Figure 6:
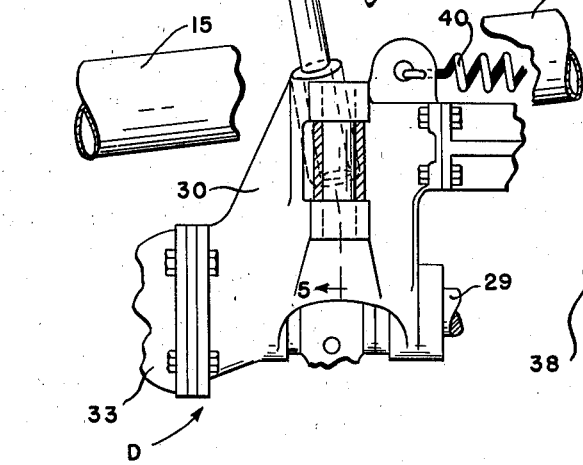
Figure 6 is a sectional view taken on the line 6—6 of Figure 4.
Figure 8:
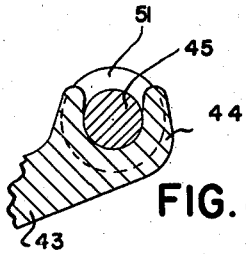
Figure 8 is a sectional view taken on the line 8—8 of Figure 4.
Figure 10:
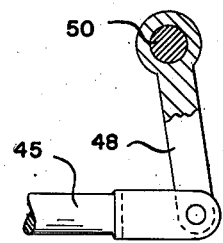
Figure 10 is a sectional view taken on the line 10—10 of Figure 2.
Figure 11:
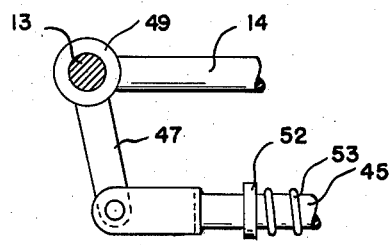
Figure 11 is a sectional view taken on the line 11—11 of Figure 2.
Figure 7:
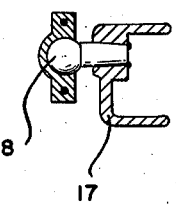
Figure 7 is a sectional view taken on the line 7—7 of Figure 4.
Figure 9:
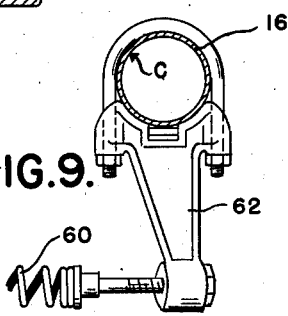
Figure 9 is a sectional view taken on the line 9—9 of Figure 4.

Referring now to the drawings, A is the tractor having a chassis B including the front and rear axle housings 10 and 11, a power take-off shaft 12, a clutch pedal shaft 13, and the usual pedal 14 for operating said shaft.

C is an auxiliary frame supported from the chassis B of the tractor and comprising two longitudinally extending tubes 15 and 16, a crossbeam 17, and a transversely extending hitch bar 18.

D is a mower assembly located at one side of the tractor and comprising a mower shoe 18', a mower bar 19 rigid with and projecting laterally outward from the shoe 18', and 20 is a reciprocating cutter or sickle bar on the mower bar 19.

21 is a transmission shaft substantially parallel to the power take-off shaft and journaled in a housing 22 suspended from the tube 15 of the auxiliary frame. 23 and 24, respectively, are pulleys fixed to the shafts 12 and 21, and 25 are belts reeved around said pulleys.

26 is a propeller shaft connected by a universal joint (not shown) to the transmission shaft 21 and journaled in a housing 27 having a universal connection 28 with the housing 22. 29 is a crank shaft journaled in a hinge bracket 30 for the mower assembly and connected by a universal joint (not shown) to the propeller shaft 26. 31 is a pitman connected to the crank arm 32 of the crank shaft and to the sickle bar 20. Thus, it will be apparent that the drive from the tractor to the sickle bar is through the power take-off shaft 12, pulleys 23 and 24, belts 25, transmission shaft 21, propeller shaft 26, crank shaft 29, and pitman 31.

The hinge bracket 30 is connected by a universal joint 33 to the propeller shaft housing 27 and is connected by a pin 34 and arm 35 to the mower shoe 18' of the mower assembly. Preferably the pin 34 extends through adjacent portions of the shoe 18' and bracket 30 and is in axial alignment with the crank shaft 29, while the arm 35 is rigid with the shoe 18' and has a bearing portion 36 mounted to turn in concentric relation about the crank shaft 29.

In the present instance, a transversely extending rod 37 cooperates with the propeller shaft housing 27 to support the hinge bracket 30 from the auxiliary frame C on the tractor. As shown, the rod 37 projects laterally from the hinge bracket 30 and is connected at its remote end by a universal joint 38 to the crossbeam 17. Thus, with this construction the hinge bracket 30 and mower assembly D are mounted to swing vertically about the universal joints 38 and 28 relative to the tractor, and the mower assembly D is mounted to swing vertically about the crank shaft 29 and pin 34 relative to the hinge bracket 30.

To permit the mower assembly D to swing back a limited amount in substantially a horizontal plane about the universal joint 38 when an obstruction is encountered by the sickle bar 20 during operation of the machine, both the propeller shaft 26 and housing 27 therefor are of the telescoping type as set forth in the application Serial No. 315,112.

A coil spring 40 terminally connected to the hinge bracket 30 and to the attaching plate 41 of the auxiliary frame C normally holds the mower bar 19 at substantially right angles to the tractor for proper cutting action but is of course yieldable to permit the backswing mentioned of the mower bar when it encounters an obstruction.

In order that the clutch of the tractor will be disengaged automatically when the mower assembly swings back as aforesaid, we have provided the following mechanism operable by the rod 37. As shown, 42 is a bracket bolted to the crossbeam 17, and 43 is a lever pivoted at 43' to the bracket 42 and having a substantially U-shaped portion 44 at its other end straddling a longitudinally extending rod 45. 46 is an adjusting screw threadedly engaging the lever 43 intermediate its ends in the path of and adapted to be engaged by the transversely extending rod 37 upon rearward swinging movement of the mower assembly. By referring to Figure 4, it will be noted that the screw 46 is normally out of contact with the rod 37, hence the latter may move freely during vertical swinging movement of the mower assembly relative to the tractor without in any way affecting the screw 46 and associated clutch actuating parts.

47 and 48 are supporting levers for the longitudinally extending rod 45. Preferably the lever 47 is pivotally connected to the rod 45 at its rear end and is rigid with the hub 49 of the clutch pedal 14, while the lever 48 is pivotally connected to the rod 45 at its forward end and is rigid with a clutch throw-out shaft 50 projecting laterally from the left side of the chassis B of the tractor. 51 and 52, respectively, are collars on the longitudinally extending rod 45, and 53 is a coil spring sleeved on said rod between said collars. By referring to Figure 4 of the drawings it will be noted that the collar 51 engages and constitutes a follower for the U-shaped end 44 of the lever 43, and that the spring 53 is compressed sufficiently to permit the clutch to be thrown out as soon as lever 43 begins to move back. Thus, when the sickle bar 20 encounters an obstruction and causes the mower assembly to swing back about the universal connection 38 as the pivot point, the transversely extending arm 37 will strike and move rearwardly the screw 46 and lever 43. The U-shaped end 44 of the lever 43 will then transmit such motion to the collar 51 through the compressed spring 53 to the collar 52 on the rod 45 so that the lever 48 connected to said rod will turn the clutch throw-out shaft 50 as though it had been operated by the pedal 14, shaft 13 and lever 47. In fact, the construction is such that the clutch throw-out shaft 50 may be operated by either the pedal 14 or the automatic mechanism mentioned to cause the clutch of the tractor to be disengaged. In this connection the clutch and parts associated therewith to the shaft 50 are conventional and therefore need not be described.

While the clutch of the tractor is disengaged as aforesaid following an encounter with an obstruction, the usual transmission lever 55 of the tractor may be operated to cause the drive from the engine to the rear axle of the tractor to be in reverse. The operator may then raise the clutch pedal 14 against the tension of the spring 53 to cause the clutch of the tractor to be reengaged so that the tractor will be backed away from the obstruction a sufficient distance to restore the mower assembly D and transversely extending arm 37 to normal position.

For counterbalancing the mower assembly D we have provided two coil springs 60 and 61, respectively. As shown, the spring 60 extends transversely beneath the tractor and is terminally connected to a depending arm 62 rigid with the tube 16 of the auxiliary frame and to an upstanding arm 64 rigid with the mower shoe 18'. The spring 61 extends longitudinally of the tractor and is terminally connected to a bracket 65 rigid with the tube 15 of the auxiliary frame and to an upstanding arm 66 of a bell crank lever 67 pivoted on a bracket 68 rigid with the tube 15 of the auxiliary frame. The depending arm 69 of the bell crank lever is connected by a chain 70 to the hinge bracket 30.

To raise the mower assembly D relative to the ground we have provided a power lift including a hydraulically actuated cable 71 trained around pulleys 72, 73 and 74 and terminally connected to the upright arm 64 on the shoe and to a lever 75 actuated from a piston 76 within a hydraulic cylinder 77. As usual, the tractor carries a pump 78 that is operatively connected to the engine of the tractor and is connected to the cylinder 77 by a conduit 79. A manually operable lever 80 is provided adjacent the driver's seat 81 of the tractor and is connected by suitable linkage 82 to a valve (not shown) in the casing 83 for controlling the flow of the fluid from the pump 78 through the conduit 79 to the cylinder 77. Thus, when the cable 71 is actuated by the lever 75 to raise the mower assembly D, the bracket 30, housing 27 and transversely extending rod 37 will be swung upwardly about the universal joints 38 and 28, and the mower shoe 18', bar 19 and sickle bar 20 carried thereby will be swung upwardly about the hinge connection between the shoe 18' and bracket 30.

What we claim as our invention is:

1. In a mowing machine, a tractor provided at spaced points longitudinally thereof with two shafts, one being a clutch actuating shaft and the other being a clutch pedal shaft, levers fixed to said shafts, a connecting rod extending between and pivotally connected to said levers, a pivotally mounted lever carried by the tractor and having a U-shaped portion straddling the rod, collars on said rod, one being fixed to the rod, the other being a follower for the U-shaped portion of the pivoted lever, a coil spring sleeved on said rod between said collars, a mower assembly adjacent the tractor and having a supporting rod universally connected to the tractor, and means for causing the connecting rod to actuate the clutch shaft including means carried by the pivoted lever and engageable by the supporting rod.

2. In a mowing machine, a tractor having a clutch actuating shaft, a mower assembly at one side of the tractor and mounted to swing vertically relative thereto, said mounting including a supporting rod universally connected to the tractor and permitting also a limited backswing of the assembly relative to the tractor when the assembly encounters an obstruction, and means for actuating the clutch shaft including a pivotally mounted element operatively connected to the clutch shaft, said element being in the path of and engageable by said rod during backswing of the mower assembly but out of the path and free of the rod during vertical swinging movement of the mower assembly.

3. In a mowing machine, a tractor having a clutch actuating shaft, a longitudinally movable member for actuating said shaft, a pivotally mounted member for actuating the longitudinally movable member, a mower assembly adjacent the tractor, means for supporting the mower assembly from the tractor including a universally mounted rod, and means for actuating the pivotally mounted member including all element carried by the pivotally mounted member in spaced relation to the rod, said element being adapted to be in the path of and engaged by the universally mounted rod when it moves in one direction and adapted to be out of the path of and free from the universally mounted rod when it moves in another direction.

4. In a mowing machine, a tractor having a clutch actuating shaft, a member operatively connected to and adapted to actuate said shaft, a member for actuating the member aforesaid, a mower assembly adjacent the tractor, means for supporting the mower assembly from the tractor including a universally mounted rod, and means for actuating the last mentioned member including an element carried by the last mentioned member in spaced relation to the rod, said element being adapted to be in the path of and engaged by the universally mounted rod when it moves in one direction and adapted to be out of the path of and free from the universally mounted rod when it moves in another direction.

5. In a mowing machine, a tractor having a clutch actuating member, a mower assembly supported from the tractor so as to swing vertically and horizontally relative thereto, the support for the mower assembly including a rod universally connected to the tractor, and means for operating the clutch actuating member including a rod operatively connected to the clutch actuating member and disposed adjacent the first mentioned rod, a lever for actuating the last mentioned rod, and an abutment for the first mentioned rod carried by said lever, said abutment being in the horizontal path and normally free and clear of the first mentioned rod and being also free and clear of the first mentioned rod during vertical movement of the mower assembly but operable by said first mentioned rod during horizontal movement of the mower assembly.

6. In a mowing machine, a tractor having a clutch actuating member, a mower assembly supported from the tractor so as to swing vertically and horizontally relative thereto, the support for the mower assembly including an elongated member mounted to swing relative to the tractor, a lever normally substantially parallel to said elongated member, an abutment for said elongated member carried by said lever, said abutment being normally spaced from and free of the elongated member and also free and clear of the elongated member during vertical movement of the mower assembly but in the path of and operable by said elongated member during horizontal movement of the mower assembly, and means operable by said lever when the abutment is engaged by the elongated member for actuating the clutch member, said last mentioned means including a member having a lost motion connection with the lever and operatively connected to the clutch member.

7. In a mowing machine, a tractor having a clutch actuating member, a mower assembly supported from the tractor so as to swing vertically and horizontally relative thereto, the support for the mower assembly including a rod universally connected to the tractor, and means for operating the clutch actuating member including a longitudinally movable rod operatively connected to said clutch actuating member, a collar fixed to said longitudinally movable rod, a spring sleeved on the longitudinally movable rod against the collar, a lever adjacent the first mentioned rod and having a portion slidable longitudinally of the second mentioned rod to exert a thrust endwise of the spring, and an abutment for the first mentioned rod carried by said lever.

8. In a mowing machine, a tractor having a clutch actuating member, a mower assembly adjacent the tractor, a support for the mower assembly having a universal connection with the tractor, and means for operating the clutch actuating member including a longitudinally movable rod operatively connected to said clutch actuating member, a collar fixed to said longitudinally movable rod, a spring sleeved on the longitudinally movable rod against the collar, a lever adjacent the mower support and having a portion slidable longitudinally of the longitudinally movable rod to exert a thrust endwise of the spring, and an abutment for the mower support carried by said lever.

9. In a mowing machine, a tractor having a clutch actuating member, a mower assembly adjacent the tractor, means for supporting the mower assembly from the tractor, said means including a transversely extending rod pivotally connected to the tractor and permitting a limited backswing of the assembly when it encounters an obstruction, and means operable automatically during backswing of the assembly to actuate said clutch member, including a reciprocating member operatively connected to said clutch member, a pivotally mounted member for actuating the reciprocating member, and an element carried by the pivotally mounted member and actuable by said transversely extending rod.

10. In a mowing machine, a tractor having a clutch actuating member, a mower assembly supported from the tractor so as to swing vertically and horizontally relative thereto, the support for the mower assembly including a universally mounted member carried by the tractor, and means for operating the clutch actuating member when the mower assembly moves horizontally including a member operatively connected to the clutch actuating member, and a member provided with an abutment engageable by the universally mounted member and adapted to actuate the last mentioned member, said abutment being normally spaced from and free of the universally mounted member and also free and clear of the universally mounted member during vertical movement of the mower assembly.

HOWARD W. SIMPSON.
ARAM ABGARIAN.